United States Patent
Kegel

(10) Patent No.: US 9,323,932 B2
(45) Date of Patent: Apr. 26, 2016

(54) PROTECTING MEMORY CONTENTS DURING BOOT PROCESS

(71) Applicant: Advanced Micro Devices, Inc., Sunnyvale, CA (US)

(72) Inventor: Andrew G. Kegel, Redmond, WA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 445 days.

(21) Appl. No.: 13/720,293

(22) Filed: Dec. 19, 2012

(65) Prior Publication Data

US 2014/0173265 A1  Jun. 19, 2014

(51) Int. Cl.
*G06F 21/57* (2013.01)
*G06F 21/78* (2013.01)

(52) U.S. Cl.
CPC .............. *G06F 21/575* (2013.01); *G06F 21/78* (2013.01)

(58) Field of Classification Search
CPC ............................... G06F 21/575; G06F 21/78
See application file for complete search history.

(56) References Cited

U.S. PATENT DOCUMENTS

| 8,631,212 B2 * | 1/2014 | Kegel et al. ................... 711/152 |
| 2009/0328042 A1 * | 12/2009 | Khosravi et al. .............. 718/100 |
| 2011/0010532 A1 * | 1/2011 | Li ..................................... 713/2 |
| 2012/0151129 A1 * | 6/2012 | Pekny ........................... 711/103 |
| 2012/0210115 A1 * | 8/2012 | Park et al. ......................... 713/2 |

* cited by examiner

*Primary Examiner* — Kim Huynh
*Assistant Examiner* — Vincent Chang
(74) *Attorney, Agent, or Firm* — Volpe and Koenig, P.C.

(57) ABSTRACT

Embodiments include methods, systems, and computer storage devices directed to identifying that a trusted boot mode (TBM) control bit is set in an input/output memory management unit (IOMMU) and configuring the IOMMU to block a DMA request received by the IOMMU from a peripheral in response to the identifying.

14 Claims, 6 Drawing Sheets

PROTECTING MEMORY CONTENTS DURING BOOT PROCESS

BACKGROUND

1. Field

The present disclosure is generally directed to computing systems, and, more particularly, to a memory management unit.

2. Background Art

Existing computing systems typically have large amounts of system memory to support multiple applications running on them and to deliver the desired performance. However, the system memory may not be fully protected from direct memory access (DMA) operations by peripherals during a boot process.

SUMMARY OF EMBODIMENTS

Embodiments provide for protecting memory contents during trusted boot of a computing system from DMA operations by peripherals.

Embodiments include methods, systems, and articles of manufacture directed to identifying that a trusted boot mode (TBM) control bit is set in an input/output memory management unit (IOMMU) and configuring the IOMMU to block a DMA request received by the IOMMU from a peripheral in response to the identifying.

Further features and advantages of the disclosure, as well as the structure and operation of various disclosed and contemplated embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate exemplary disclosed embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

Figure 1:
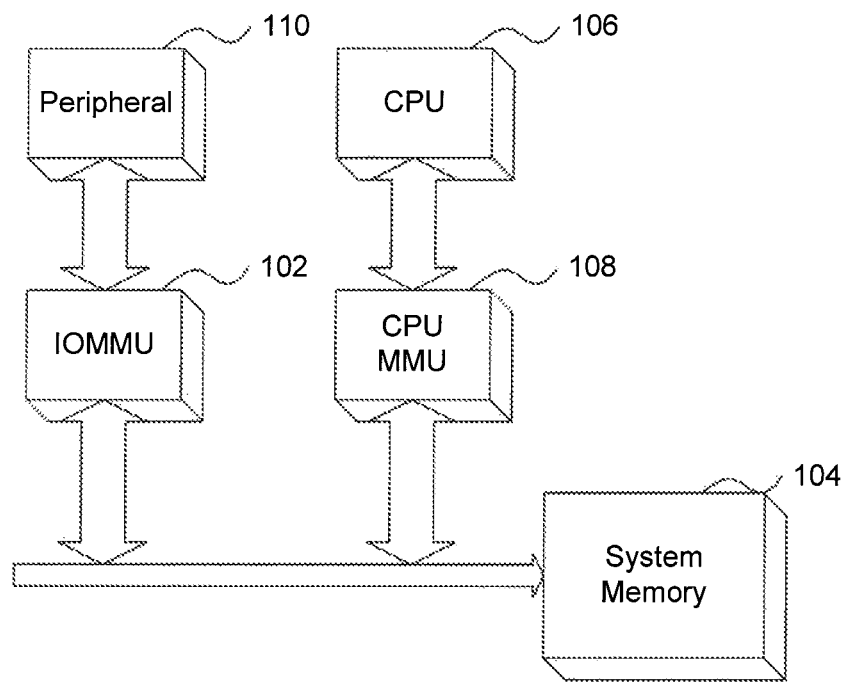
FIG. 1 is a block diagram illustrating a computing system with an IOMMU.

The features and advantages of the disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Any reference to modules in this specification and the claims means any combination of hardware or software components for performing the intended function. A module need not be a rigidly defined entity, such that several modules may overlap hardware and software components in functionality. For example, a module may refer to a single line of code within a procedure, the procedure itself being a separate module. One skilled in the relevant arts will understand that the functionality of modules may be defined in accordance with a number of stylistic or performance-optimizing techniques, for example.

A conventional input/output memory management unit (IOMMU) can block DMA operations during the boot process. However, such implementation is complex and requires relatively large data structures in memory. The IOMMU may also depend on bus/device/function (BDF) numbers used by peripherals which may have not been assigned during the boot process or may have been assigned, but may require large in-memory tables.

Another approach is to use secure kernel initialization instruction (SKINT) to protect system memory from DMA operations during the boot process. However, the amount of memory that can be protected by this approach is relatively small (for example, about 64K bytes). Further, the protection offered by SKINT instruction ends on completion of the SKINT instruction. Alternatively, a software solution may be used. However, software solutions may work for processor accesses, but do not work for peripherals as peripherals can operate independently.

Each of the approaches described above are inadequate as they do not protect relatively larger memories of present computing systems or do not protect system memory during the entire duration of the trusted boot process.

Embodiments provide for a mechanism to protect system memory during a trusted boot process. Embodiments include addition of registers to an IOMMU to enable trusted boot firmware control peripheral access to system memory during the trusted boot process. The proposed mechanism does not require any processor changes, and uses many existing IOMMU functions in a way to make the trusted boot firmware simple and less complex, and also consuming small amounts of memory.

FIG. 1 is a block diagram illustration of a system 100, in accordance with an embodiment. System 100 includes a central processing unit (CPU) 106 and a CPU memory management unit (MMU) 108 associated with CPU 106. System 100 further includes an input/output memory management unit (IOMMU) 102 associated with peripheral 110. Although not illustrated here, multiple IOMMUs 102 are contemplated in system 100, just as multiple CPU MMUs 108 and multiple peripherals 110. Multiple peripherals 110 can also share a single IOMMU 102.

IOMMU 102 operates in accordance with a set of defined functions and behaviors. These functions and behaviors are associated with a set of commands and data that are read by IOMMU 102 from a system memory 104.

A person of skill in the art will understand that IOMMU 102 can be implemented using software, firmware, hardware, or any combination thereof. In one embodiment, some or all of the functionality of IOMMU 102 is specified in a hardware description language, such as Verilog, RTL, netlists, etc. to enable ultimately configuring a manufacturing process through the generation of maskworks/photomasks to generate a hardware device embodying aspects described herein.

Peripherals 110 can generate read and write operations to system memory 104 that flow through IOMMU 102. IOMMU 102 can translate virtual and physical addresses between peripherals 110 and system memory 104 and can also perform interrupt remapping. Interrupt remapping function is similar to address translation and translates addresses corresponding to remapping interrupts.

Figure 2:
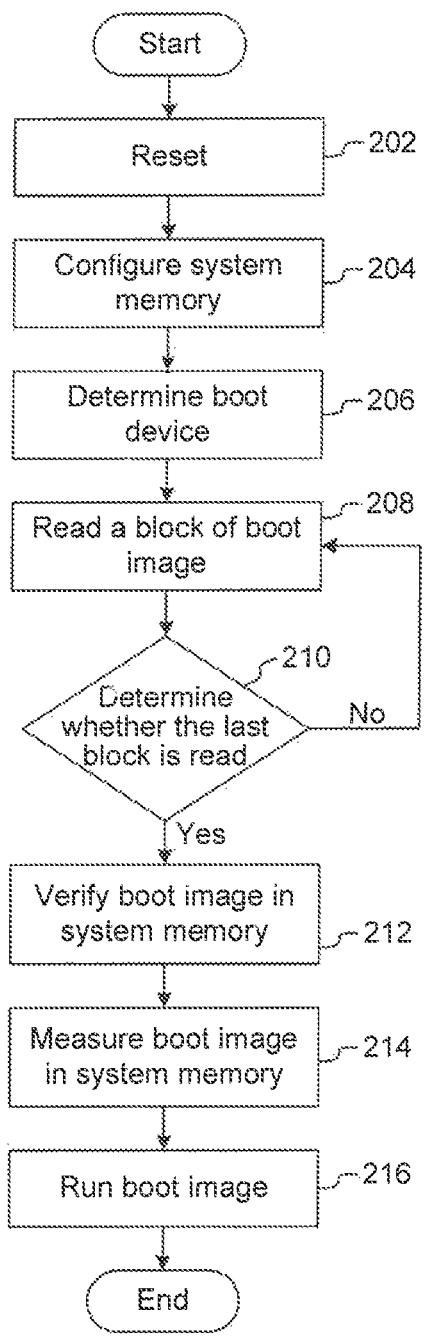
FIG. 2 is a flow diagram illustrating a boot process in a computing system.

FIG. 2 is a flow diagram illustrating a boot process 200 in system 100.

At operation 202, system 100 can receive a hardware reset signal which takes system 100 to a known state and passes control of system 100 to boot firmware stored in system 100. This can also occur when system 100 is turned-on or powered-on. For example, boot firmware can include instructions stored in a read only memory (ROM) or a flash memory. The boot firmware initially obtains control from system 100 and configures portions of system 100 (for example, system memory 104). The boot firmware can also load a boot image. For example, the boot image can be an operating system or a hypervisor that controls system 100 for majority of time that system 100 is running.

At operation 204, the boot firmware configures system memory 104.

At operation 206, the boot firmware will set up basic hardware of system 100 and determine a boot device. For example, the boot device can be a disk, a network interface, a USB storage device, or any other readable media.

At operation 208, the boot firmware starts reading the boot image from the boot device determined above. The boot process uses direct memory access (DMA) operations to retrieve the boot image from the boot device.

DMA allows certain hardware subsystems (for example, peripherals) within system 100 to access system memory 104 independently of CPU 106. Without DMA, CPU 106 may be fully occupied for entire duration of a read or a write operation, and may be unavailable to perform other functions. With DMA, CPU 106 can initiate a transfer from system memory 104, perform other operations while the transfer is in progress, and can receive an interrupt from a DMA controller when the transfer from system memory 104 has finished.

DMA is generally useful when CPU 106 cannot keep up with the rate of data transfer or where CPU 106 needs to perform other useful work while waiting for a relatively slow input/output (IO) data transfer. Many hardware systems (for example, disk drive controllers, graphics cards, network cards and sound cards) use DMA operations. DMA operations can also be used for intra-chip data transfers in multi-core processors.

Systems that have DMA channels can transfer data to and from devices with much less CPU overhead than systems without a DMA channel. Similarly, a processing element inside a multi-core processor can transfer data to and from its local memory without occupying its processor time, allowing computation and data transfer to proceed in parallel. DMA can also be used for "memory to memory" copying or moving of data within memory. DMA can also offload expensive memory operations, such as large copies or scatter-gather operations, from a CPU to a dedicated DMA engine.

At operation 210, it is determined whether the last block of the boot image is read (for example, whether the reading of the boot image from the boot device is finished). If it is determined that the last block of boot image is not read (for example, one or more blocks of boot image are left to be read), method 200 returns to operation 208 to read the next block of the boot image.

If it is determined that the last block of boot image has been read (for example, the reading of the boot image from the boot device is finished), then at operation 212, the boot firmware verifies the boot image. For example, the verification can be called as "checking the signature" of the boot image.

At operation 214, the boot firmware measures the boot image that is read from the boot device, and can record the results in a trusted platform module (TPM). A TPM provides support that assures the integrity of a computing platform or system 100.

At operation 216, control passes from the boot firmware to the boot image that was read from the boot device as described above.

However, there are some drawbacks associated with the process described above. During the interval from completion of operation 204 to completion of operation 214, peripheral 110 (for example, a key board, a printer, or a fax) can view contents of system memory 104 (for example, secret keys) or modify contents of system memory 104 (for example, insert malicious software). Additionally, the verification at operation 212 or the measurement at operation 214 may report incorrect results as a rogue peripheral (for example, peripheral 110) can modify contents of the boot image. For example, a rogue peripheral can modify first half of the boot image while second half of the boot image is being verified which can corrupt system memory 104.

The mechanism described below with reference to FIG. 3 addresses the drawbacks associated with the process described above.

Figure 3:
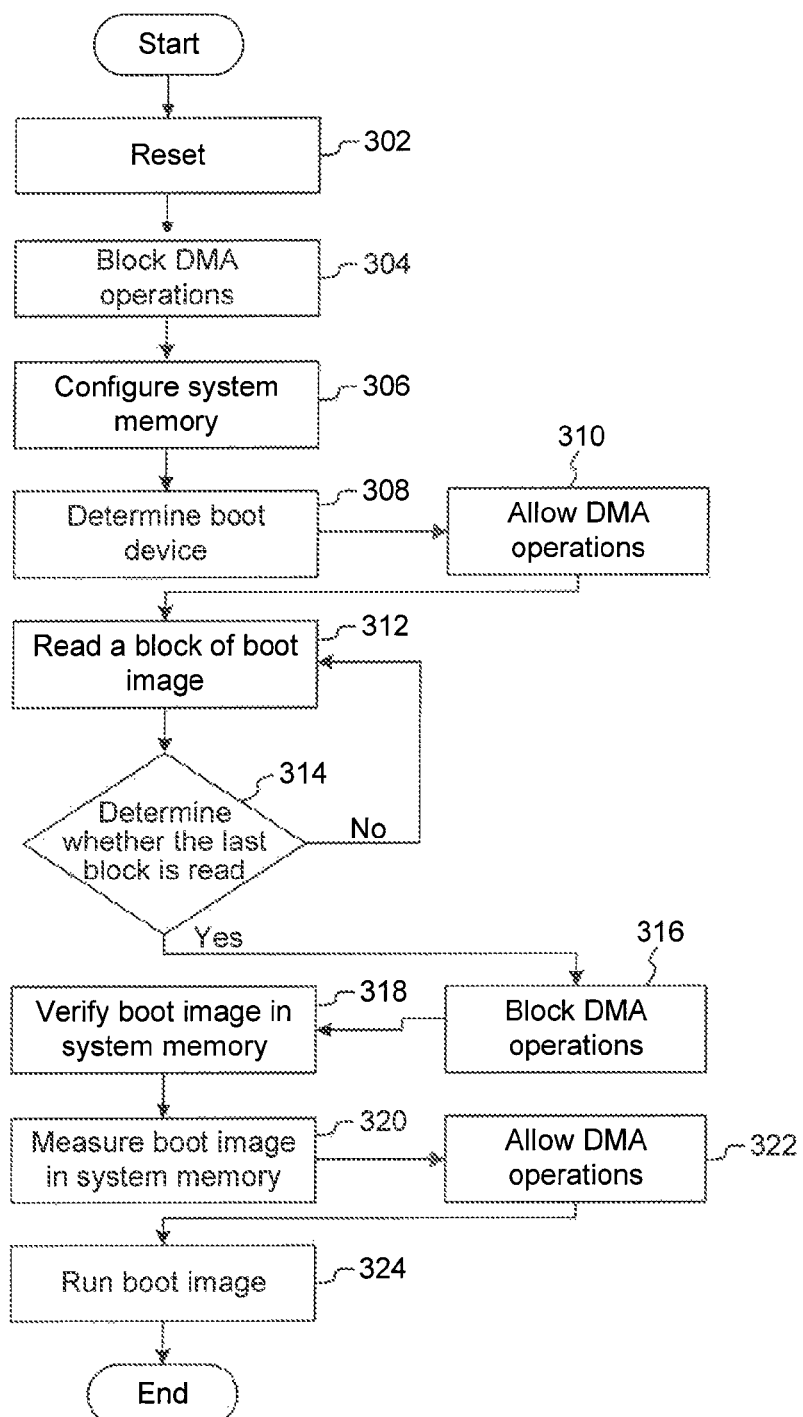
FIG. 3 is a flow diagram illustrating a trusted boot process, in accordance with an embodiment.

FIG. 3 is a flow diagram illustrating a trusted boot process 300 in system 100, in accordance with an embodiment.

At operation 302, system 100 receives a hardware reset signal which takes system 100 to a known state and passes control of system 100 to a boot firmware stored in system 100, as described above. This can also occur when system 100 is turned-on or powered-on.

At operation 304, DMA operations from peripherals 110 are blocked by the boot firmware. The blocking (or allowing) of DMA operations from peripherals 110 is described below by operations 304-324. The blocking of DMA operations after completion of operation 302 addresses the drawbacks of boot process described above. Although, the boot firmware can block DMA operations from peripherals 110 after completion of operation 302 by properly programming IOMMU 102, the boot firmware may be too compact to support complex code used to block the DMA requests from peripherals 110.

At operation 306, the boot firmware configures system memory 104 as described above.

At operation 308, the boot firmware will set up basic hardware of system 100 and determines a boot device as described above.

At operation 310, DMA operations from peripherals 110 are allowed as the boot process may use DMA operations to retrieve the boot image from the boot device identified above. System 100 will allow DMA operations from peripherals 110 until reading of the boot image is complete as described below.

At operation 312, the boot firmware starts reading the boot image from the selected boot device as described above.

At operation 314, it is determined whether the last block of the boot image is read (for example, whether the reading of the boot image from the boot device is finished). If it is determined that the last block of the boot image is not read (for example, one or more blocks of the boot image are left to be read), method 300 returns to operation 312 to read a next block of the boot image.

If it is determined that the last block of boot image has been read (for example, reading of the boot image from the boot device is finished), then at operation 316, the boot firmware blocks DMA operations from peripherals 110 to protect the boot image.

At operation 318, the boot firmware verifies the boot image without the risk of a rogue peripheral (for example, peripherals 110) viewing or modifying the boot image as DMA operations from peripherals 110 are blocked at operation 316 above.

At operation 320, the boot firmware measures the boot image that is read from the boot device and can record the results in a trusted platform module (TPM) as described above.

At operation 322, DMA operations blocked at operation 316 above are once again allowed as the verification and measurement of the boot image is complete.

At operation 324, control passes from the boot firmware to the boot image that was read from the boot device as described above.

Figure 4A:
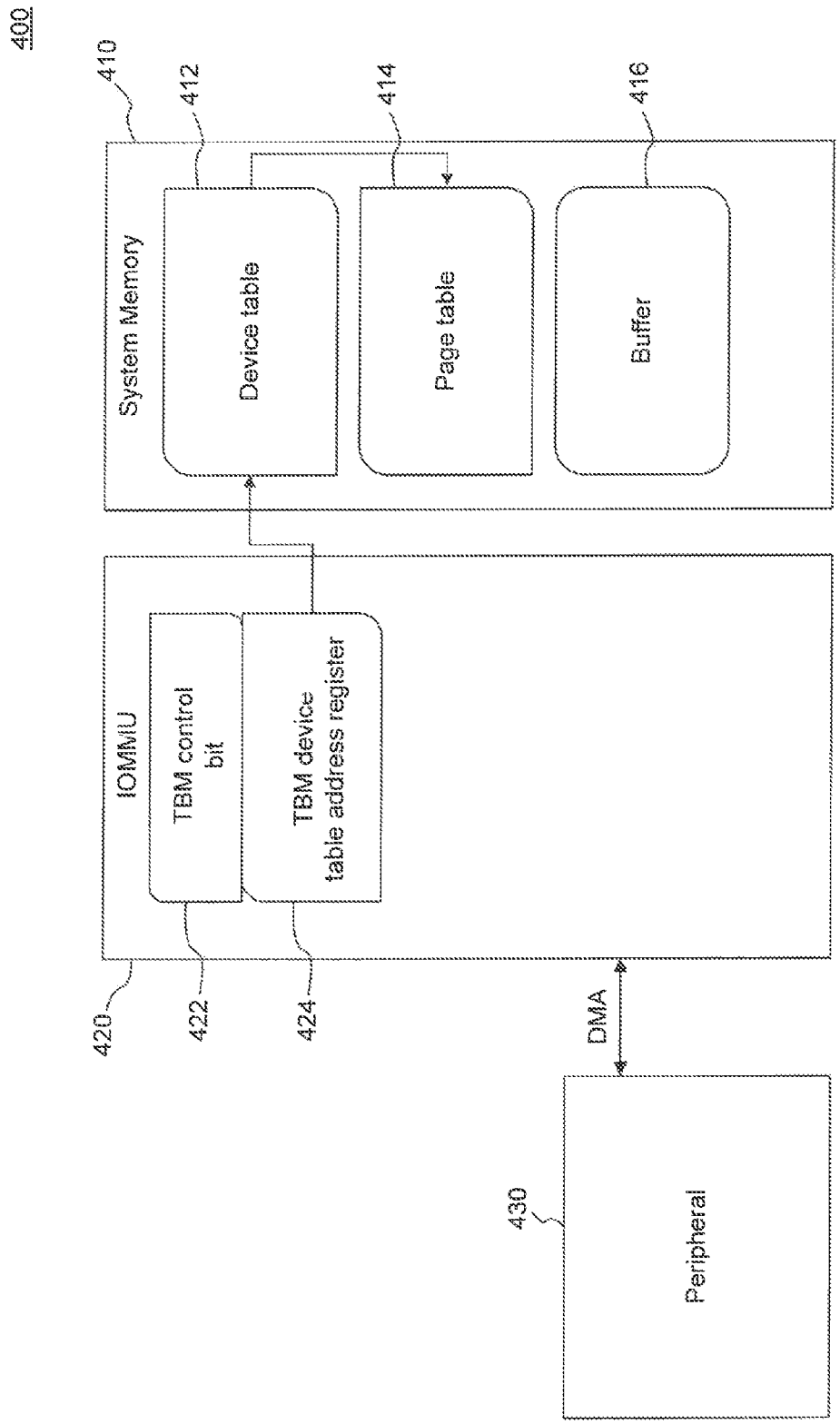
FIG. 4A is a block diagram illustrating a computing system, in accordance with an embodiment.

FIG. 4A is a block diagram illustrating a system 400 that can perform trusted boot process, in accordance with an embodiment. An example computing system 400 in FIG. 4A includes a system memory 410, an IOMMU 420 and one or more peripherals 430.

System memory 410 can include at least one non-persistent memory, such as dynamic random access memory (DRAM). System memory can store processing logic instructions, constant values, and variable values during execution of portions of applications or other processing logic. The term "processing logic," as used herein, refers to control flow instructions, instructions for performing computations, and instructions for associated access to resources.

System memory 410 can also include a device table 412, a page table 414, and a buffer 416. Device table 412 allows I/O devices to be assigned to specific domains. Device table 412 can also be configured to include pointers to page tables of the I/O devices. While an IOMMU 420 can translate memory addresses accessed by I/O devices, a host operating system (OS) may set up its own page tables by constructing I/O page table 414 that specify the desired translation. The host OS may make an entry in device table 412 pointing to the newly constructed page table 414 and can notify IOMMU 420 of the newly updated device entry.

A trusted boot mode (TBM) control bit 422 and a TBM device table address register 424 are added to IOMMU 420. TBM control bit 422 is used to enable or disable the trusted boot process of FIG. 3 described above to protect system memory 104. If TBM control bit 422 is enabled or asserted (for example, turned ON or set to a value of 1), DMA operations from one or more peripherals 430 to buffer 416 in system memory 410 will be intercepted by IOMMU 420 and routed through IOMMU 420. IOMMU 420 uses TBM device table address register 424 to find device table 412 located in system memory 410 to retrieve necessary information. For example, the necessary information retrieved can include translation information and base address of page table 414.

Once IOMMU 420 retrieves necessary information, IOMMU 420 can process a DMA request which can include verifying that the DMA request is allowable and translation of a virtual address to a physical address. In an embodiment, device table 412 can contain a single entry as peripherals 430 may be treated as if they are the same.

Normal software access to control IOMMU 420 is performed through memory mapped input/output (MMIO) space. However, preliminary configuration and programming of IOMMU 420 is through peripheral component interconnect (PCI) configuration space. PCI configuration space is a way that conventional PCI, PCI-X and PCI Express perform auto configuration of modules inserted into their bus.

In PCI configuration space, IOMMU 420 can define a "bit" (for example, an "enable" bit) to activate IOMMU 420 to start processing DMA operations during the boot process. However, the enable bit can also lock certain parameters from being changed (for example, for security and to protect normal operations). As the trusted boot process may need different parameters than operational system software, it is not desirable to enable (and lock) IOMMU 420 parameters during the trusted boot.

In an embodiment, TBM mode control bit 422 can be configured in PCI configuration space to avoid the need for IOMMU 420 to be fully configured and enabled to support conventional operations.

When TBM control bit 422 is used in conjunction with TBM device table address register 424 in PCI configuration space to contain a device-table base address, TBM control bit 422 can also be used as an "enable" bit for IOMMU 420 causing IOMMU 420 to start processing DMA operations independent of the conventional enable bit in the MMIO control register as described above.

Additionally, TBM control bit 422, when enabled or asserted, can also be used to allow boot devices access to system memory 410, subject to controls in an associated page table 414. TBM control bit 422 can also allow quickly modifying TBM device table address register 424 to point to a new page table with different permissions (for example, no access). For example, the trusted boot firmware would enable DMA operations (for example, when TBM control bit 422 is asserted and TBM device table address register 424 is configured) and can issue a read operation to the disk to get the necessary information for the boot process.

When the disk operation completes, the boot firmware would disable DMA operations (change TBM device table address register 424 or change contents of device table 412) while the firmware decrypts the information received. In this way, a processor can validate contents of buffer 416 without risk of DMA corruption (for example, check the signature on the buffer) and can decrypt the buffer without risk of DMA peeking.

This can be done repeatedly back and forth to read in multiple blocks of information during the trusted boot process. With proper programming of page tables 414, previous areas of decoded or signature-verified information can be protected during DMA operations. When the trusted boot process is complete, TBM control bit 422 is disabled or deasserted and control of IOMMU 420 passes to the operating system. At this point, the system software would program IOMMU 420 normally.

Figure 4B:
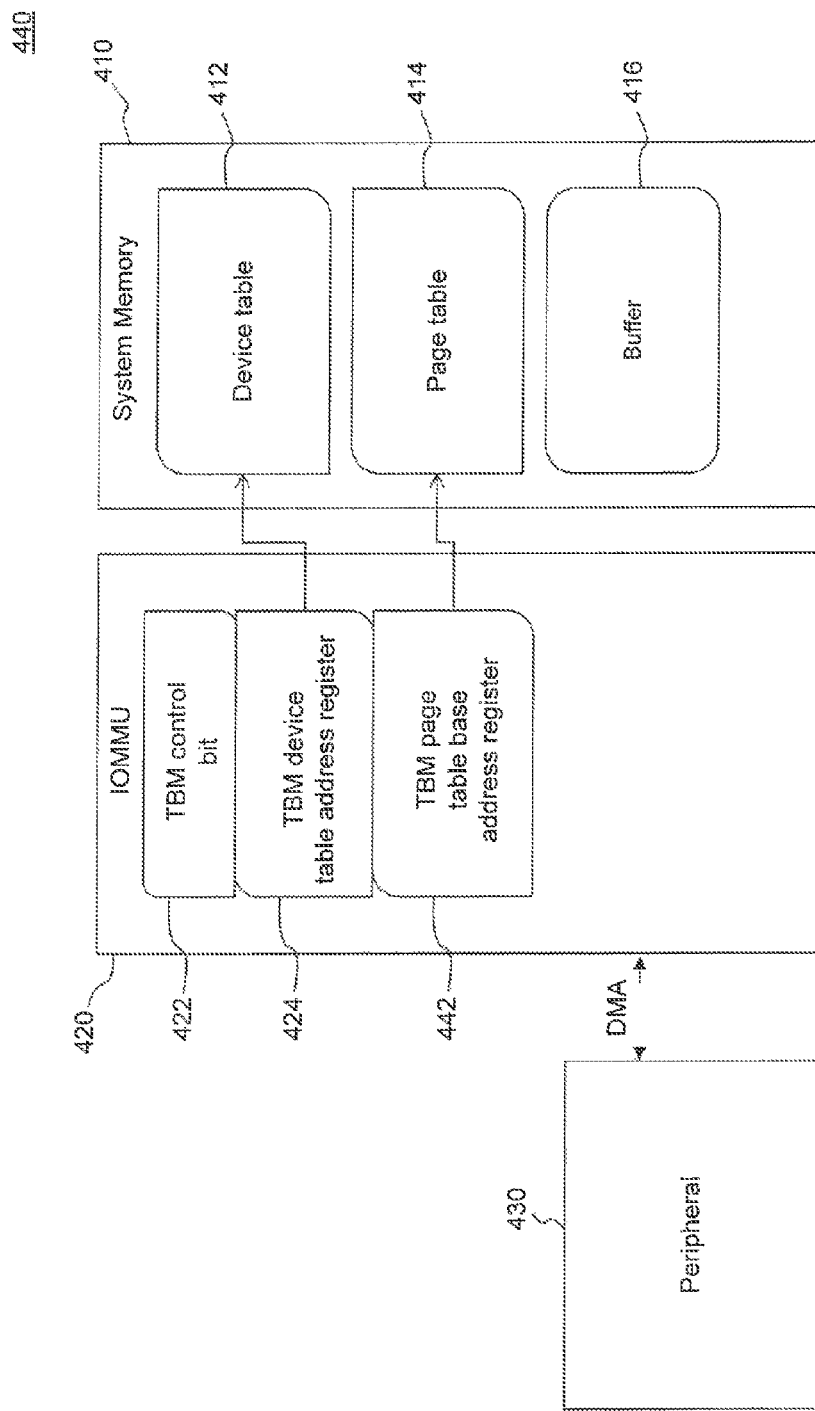
FIG. 4B is a block diagram illustrating a computing system, in accordance with an alternate embodiment.

FIG. 4B is a block diagram illustrating a system 440 that can perform trusted boot process, in accordance with an alternate embodiment. Additional information can be stored in IOMMU registers that are visible in PCI configuration space.

In an embodiment, a TBM page table base address register 442 is stored in IOMMU 420. Therefore, there is no need for IOMMU 420 to use a page table base address that is generally stored in device table 412. IOMMU 442 instead uses contents of TBM page table base address register 442.

In an embodiment, control bits that are generally taken from an in-memory version of device table 412 can be stored in TBM device table address register 424 so that there is no need for device table 412.

Figure 4C:
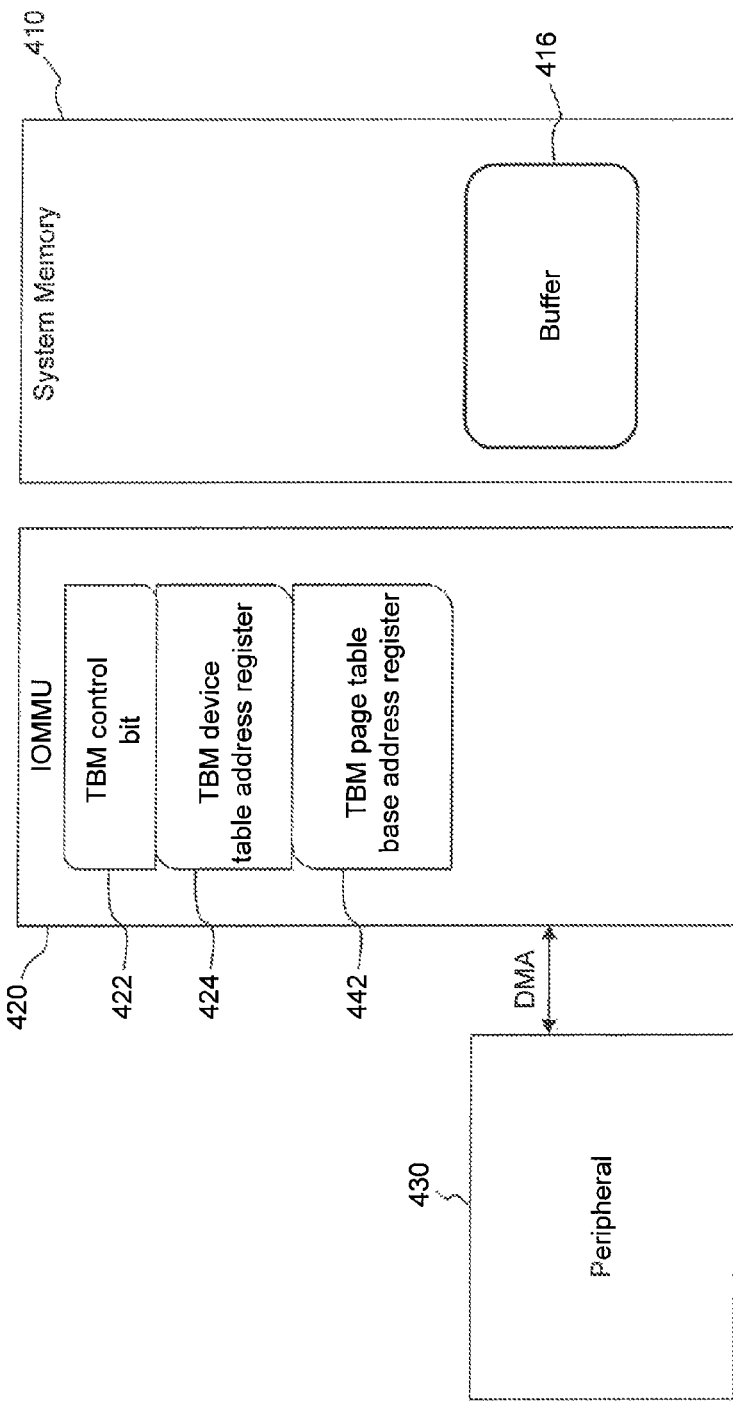
FIG. 4C is a block diagram illustrating a computing system, in accordance with an alternate embodiment.

FIG. 4C is a block diagram illustrating a system 480 that can perform trusted boot process, in accordance with an alternate embodiment.

In an embodiment shown in FIG. 4C, a form of address translation can be adopted and encoded directly in TBM device table address register 424. This implementation can make device table 412 and page table 202 unnecessary. In an embodiment, information necessary to process DMA operations from peripherals 430 can be available in IOMMU registers where it can be quickly accessed by hardware and modified by software. Further, the total register storage required for this implementation can be approximately 64 bytes.

The Summary and Abstract sections may set forth one or more but not all exemplary embodiments as contemplated, and thus are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Reading this description, it will become apparent to a person skilled in the relevant art how to implement these embodiments using other computer systems and/or computer architectures. Embodiments may further operate with software, hardware, firmware, and/or operating system implementations other than those described herein. Therefore, any software, hardware, firmware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments as contemplated, and thus are not intended to limit in any way. Various embodiments are described herein with the aid of functional building blocks for illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method, comprising:
    identifying that a trusted boot mode (TBM) control bit is set in an input/output memory management unit (IOMMU);
    configuring the IOMMU to block one or more direct memory access (DMA) requests received by the IOMMU from one or more peripherals in response to the identifying, wherein the blocking of the one or more DMA requests includes:
        reading a block of a boot image from a boot device;
        blocking the one or more DMA requests from the one or more peripherals if the read block is the last block of the boot image; and
        reading a subsequent block of the boot image from the boot device if the read block is not the last block of the boot image; and
    allowing the one or more DMA requests received from the one or more peripherals in response to the boot device being identified.

2. The method of claim 1, further comprising:
    determining that a boot image is verified and measured; and
    allowing the one or more DMA requests from the one or more peripherals in response to the determining that the boot image was verified and measured.

3. The method of claim 2, wherein the verifying comprises checking a signature of the boot image.

4. The method of claim 2, wherein the measuring comprises measuring the boot image and recording a result of the measuring in a trusted platform module (TPM).

5. A system, comprising:
    an input/output memory management module (IOMMU) configured to:
    identify that a trusted boot mode (TBM) control bit is set in the IOMMU;
    block one or more direct memory access (DMA) requests received by the IOMMU from one or more peripherals when the TBM control bit is set, wherein the IOMMU is configured to:
        read a block of a boot image from a boot device, block the one or more DMA requests from the one or more peripherals if the read block is the last block of the boot image, and read a subsequent block of the boot image from the boot device if the read block is not the last block of the boot image; and allow the one or more DMA requests from one or more peripherals when the boot device is identified.

6. The system of claim 5, wherein the IOMMU is further configured to:

determine that a boot image is verified and measured; and allow the one or more DMA requests from the one or more peripherals when the boot image is verified and measured.

7. The system of claim 6, wherein verification of the boot image comprises checking a signature of the boot image.

8. The system of claim 6, wherein measurement of the boot image comprises recording a result of the measurement in a trusted platform module (TPM).

9. The system of claim 5, wherein the one or more DMA requests are blocked based on whether a trusted boot mode (TBM) control bit is set.

10. The system of claim 9, wherein the TBM control bit is stored in the IOMMU.

11. A computer readable storage device having computer program logic recorded thereon, execution of which, by a computing device, causes the computing device to perform operations, comprising:

identifying that a trusted boot mode (TBM) control bit is set in an input/output memory management unit (IOMMU);

configuring the IOMMU to block one or more direct memory access (DMA) requests received by the IOMMU from one or more peripherals in response to the identifying, wherein the IOMMU is configured to:

read a block of a boot image from a boot device, block the one or more DMA requests from the one or more peripherals if the read block is the last block of the boot image, and read a subsequent block of the boot image from the boot device if the read block is not the last block of the boot image; and allowing the one or more DMA requests received from the one or more peripherals in response to the boot device being identified.

12. The computer readable storage device of claim 11, the operations further comprising:

determining that a boot image is verified and measured; and allowing the one or more DMA requests from the one or more peripherals in response to the determining that the boot image was verified and measured.

13. The computer readable storage device of claim 12, wherein the verifying comprises checking a signature of the boot image.

14. The computer readable storage device of claim 12, wherein the measuring comprises measuring the boot image and recording a result of the measuring in a trusted platform module (TPM).

* * * * *